United States Patent [19]

Reitmeier

[11] 4,282,546
[45] Aug. 4, 1981

[54] TELEVISION IMAGE SIZE ALTERING APPARATUS

[75] Inventor: Glenn A. Reitmeier, Trenton, N.J.
[73] Assignee: RCA Corporation, New York, N.Y.
[21] Appl. No.: 98,357
[22] Filed: Nov. 28, 1979
[51] Int. Cl.³ .......................................... H04N 9/535
[52] U.S. Cl. .................................... 358/22; 358/183; 358/160
[58] Field of Search ............... 358/21 R, 22, 160, 180, 358/183

[56] References Cited

U.S. PATENT DOCUMENTS

| 4,134,128 | 1/1979 | Hurst | 358/22 |
| 4,163,249 | 7/1979 | Michael | 358/21 R |
| 4,204,227 | 5/1980 | Gurley | 358/22 |

FOREIGN PATENT DOCUMENTS 2016857 9/1979 United Kingdom ...................... 358/22

OTHER PUBLICATIONS

Patten; "The Digital Video Effects (DVE) System"; Apr., 1978; pp. 214-218, SMPTE Journal; vol. 87.

Squeezoom, Vital Industries, Inc.

Primary Examiner—Robert L. Griffin
Assistant Examiner—Michael A. Masinick
Attorney, Agent, or Firm—Paul J. Rasmussen; William H. Meise; John M. O'Meara

[57] ABSTRACT

In television image size altering apparatus of the type wherein pixels relating to a composite video signal are sampled at a synchronous real time rate and wherein the flow of pixel information is coordinated through a memory by a write control and a read control, the composite pixel information is separated into original pixels relating to each basic component of the video signal. Interpolated pixel values are then derived from the original pixel values at an effective rate less than the synchronous rate when compressing the image size and at an effective rate greater than the synchronous rate when expanding the image size. The interpolated pixel values are then combined into new pixel values relating to a new composite video signal and the new pixel values are presented for display at the synchronous rate to alter the size of the television image.

6 Claims, 10 Drawing Figures

TELEVISION IMAGE SIZE ALTERING APPARATUS

BACKGROUND OF THE INVENTION

This invention relates to television image size altering apparatus and more particularly, to such apparatus for compressing and/or expanding a television image to derive any desired aspect ratio thereof. In the prior art, different digital techniques have been utilized for altering the size of a television image. Image compression is accomplished with one technique by omitting both horizontal scan lines and picture elements or pixels within horizontal scan lines, as disclosed in U.S. Pat. No. 4,134,128. Because of the omitted signal information however, this technique reduces the picture quality. With another technique, interpolation is performed on the luminance component of the signal between horizontal scan lines and between pixels within horizontal scan lines to either compress or expand the image. However, the picture quality is also reduced for this technique due to the single signal component interpolation and problems due to aliasing or fold-over are possible therewith.

SUMMARY OF THE INVENTION

A television image size altering apparatus is provided for either compressing or expanding the image size. Original pixels relating to a composite video signal and sampled at some synchronous or real time rate are separated into their basic R, G, B or Y, I, Q components. Individual processors interpolate pixel values for each component from the original pixel values at an effective rate less than the synchronous rate when compressing the image size and at an effective rate greater than the synchronous rate when expanding the image size. The interpolated pixels for each signal component are then combined into new pixels relating to a new composite video signal and these new pixels are then presented for display at the synchronous rate to alter the size of the television image. In some preferred embodiments, aliasing or fold-over is avoided by band limiting the original pixels to establish the rate of the interpolated pixels at a level above the Nyquist rate when compressing the image size.

DESCRIPTION OF THE PREFERRED EMBODIMENTS

Figure 1A:
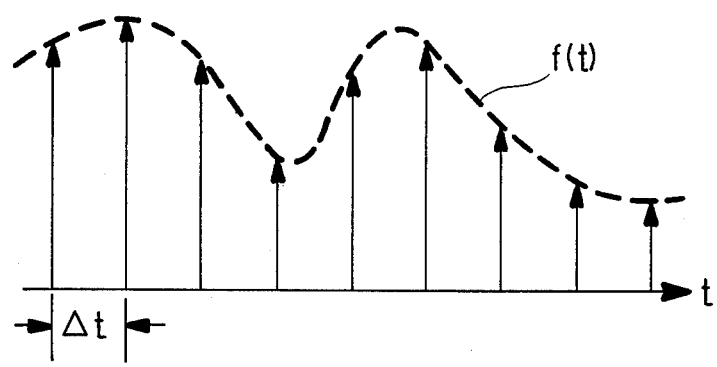
FIGS. 1a, 1b, 1c, 1d, and 1e illustrate the time/frequency scaling technique that has been utilized in the art for altering the size of a television image.
Figure 1B:
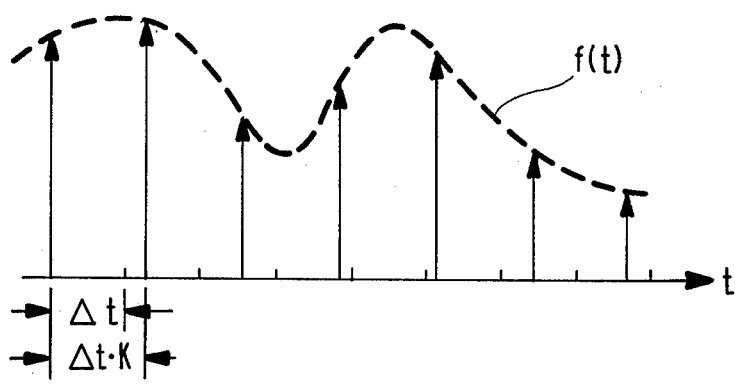
Figure 1C:
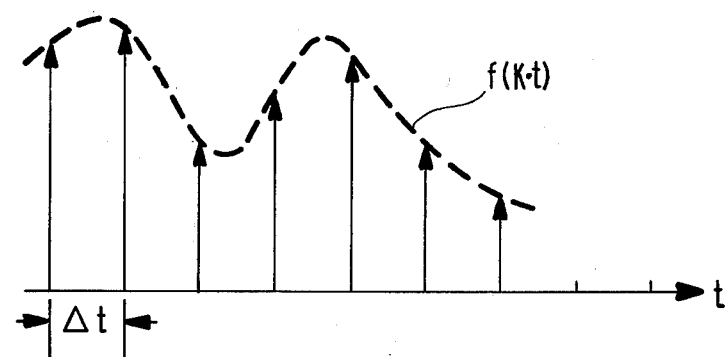
Figure 1D:
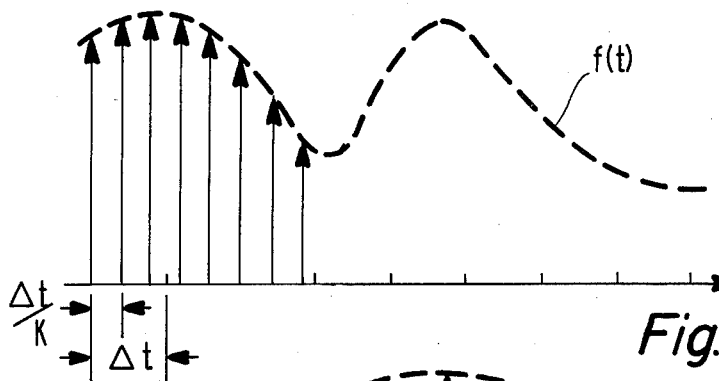
Figure 1E:
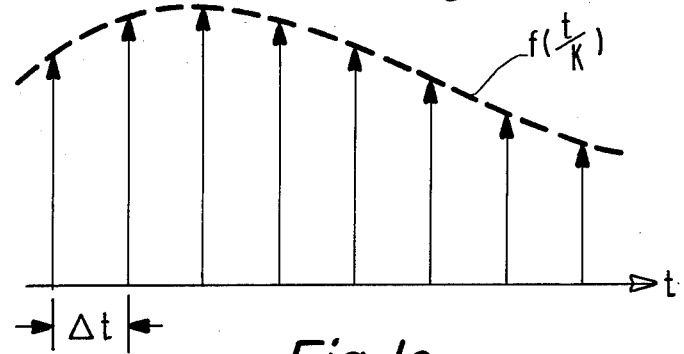

Time/frequency scaling has been utilized in the art to alter the size of a television image and this technique is illustrated in FIGS. 1a through 1e. As shown in FIG. 1a, this technique requires that original pixel values be sampled for the video signal f(t) at some synchronous rate $\Delta t$ which is usually determined by a master clock. To compress the television picture in size to 1/k times its original size, interpolated pixel values for the video signal f(t) are derived from the original pixel values at a rate $\Delta t \cdot k$ as shown in FIG. 1b and these interpolated pixels are played back at the synchronous rate $\Delta t$ to produce the television signal f(k·t) as shown in FIG. 1c. To expand the television picture in size to k times its original size, interpolated pixel values for the video signal f(t) are derived from the original pixel values at a rate $\Delta t/k$ as shown in FIG. 1d and these interpolated pixels are played back at the synchronous rate $\Delta t$ to produce the video signal f(t/k) as shown in FIG. 1e.

Figure 2:
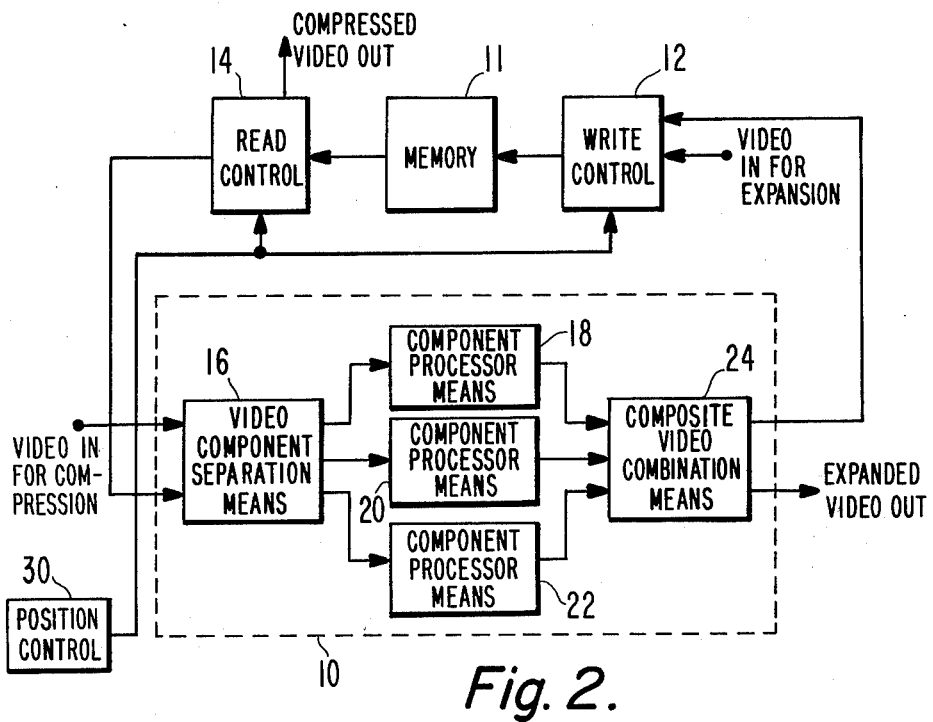
FIG. 2 is a block diagram for one preferred embodiment of the invention wherein the video signal is separated into its basic components and the time/frequency scaling technique is applied to each such component.

The television image size altering apparatus 10 of this invention is shown incorporated with a video synchronizer in the block diagram of FIG. 2. A means (not shown) for sampling the composite video signal at some synchronous or real time rate, such as four times subcarrier frequency, is included as part of the video synchronizer to provide a predetermined number of pixels per line and lines per field. A memory 11 through which the flow of pixel information is coordinated by a write control 12 and a read control 14 is also included in the video synchronizer. The composite video signal pixels are applied to the image size altering apparatus 10 at a means 16 for separating those pixels into original pixels relating to each basic component of the video signal, such as the well known R, G, B, or Y, I, Q components. When the television picture is to be compressed, the composite signal pixels are applied directly to the separation means 16 but when the television picture is to be expanded, those pixels are applied thereto through the memory 11 within the video synchronizer. The original pixels for each video component are applied to individual component processor means 18, 20, and 22 for deriving interpolated pixel values from the original pixels at an effective rate less than the synchronous rate when compressing the image size and at an effective rate greater than the synchronous rate when expanding the image size. The interpolated pixels relating to each video component are applied to a means 24 for combining those pixels into new pixels relating to a new composite video signal and these new pixels are then presented for display at the synchronous rate to alter the size of the television image in accordance with the previously explained time frequency scaling technique. When expanding the image, the new pixels are presented for display directly from the combination means 24 but when compressing the image, the new pixels are presented for display through the memory 11 within the video synchronizer.

Rate compatibility between the original, interpolated and new pixels is accomplished through the memory 11 within the video synchronizer. During picture compression, the original pixels of the composite video signal at the synchronous rate are applied directly to the separation means 16 because the interpolated pixels are being derived at a rate less than the synchronous rate. However, the new pixels are also being derived by the combination means 24 at a rate less than the synchronous rate and consequently, they must be directed through the memory 11 for display at the synchronous rate. During picture expansion, the synchronous rate of the original pixels in the composite video signal must be retarded because the interpolated pixels are derived at an effective rate greater than the synchronous rate. Therefore, the original pixels are applied to the video component separation means 16 through the memory 10 at the retarded rate required to derive the interpolated pixels at the synchronous rate. Due to the retarded rate of the original pixels, the effective rate of the interpolated pixels derived during expansion is greater than the synchronous rate. However, the new pixels are actually being derived from the combination means 24 at the synchronous rate and consequently, they are applied directly therefrom for display. Every original pixel of the composite video signal has specific horizontal and vertical locations in the raster of the television picture and the apparatus of this invention may be adapted to either compress or expand the size of an image in the horizontal and/or vertical direction. Furthermore, the degree of picture compression or expansion in the horizontal and/or vertical directions may be made adjustable within the component processor means 18, 20, and 22. Also, conventional techniques may be utilized to adjustably locate either compressed or expanded images within the raster through a position control 30, such as the technique disclosed in the copending application of Gurley et al. entitled, "TELEVISION PICTURE POSITIONING APPARATUS," filed Dec. 19, 1977 and given Ser. No. 862,178.

Although the component processor means 18, 20, and 22 have common structures and identical functional characteristics, many different embodiments thereof are possible. The preferred embodiments for each component processor means 18, 20, and 22 are illustrated in the block diagram of FIG. 3 wherein a means 32 is utilized for applying polynomial functions to derive the interpolated pixel values from the original pixel values. A buffer memory 34, such as a shift register, is connected to direct the original pixel values to the polynomial interpolation means 32. As discussed previously regarding FIG. 2, the original pixel values relate to a single video component and are directed to the memory 34 from the video component separation means 16. A means 36 is connected to the polynomial interpolation means 32 for controlling the rate at which the interpolated pixels are derived.

Polynomial functions are commonly utilized in the art to interpolate unknown information from sample information. Depending on the order N of the polynomial function, the number of information samples required for interpolation is N+1. Therefore, the structure of the polynomial interpolation means 32 and the required capacity of the memory 34 will depend on what order of polynomial function is utilized. The original pixel values are continuously clocked through the memory 34 and a single interpolated pixel is derived each time the rate control means 36 enables the interpolation means 32.

Figure 3:
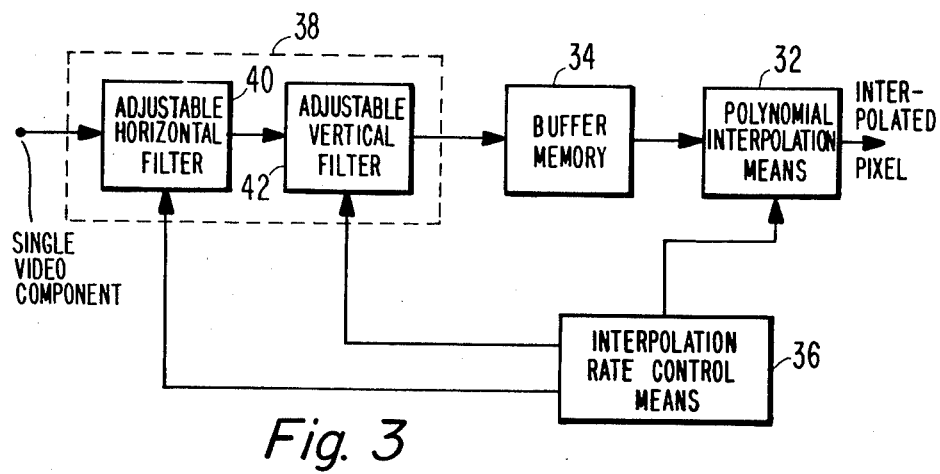
FIG. 3 is a block diagram of a pixel processor for compressing or expanding a single component of the video signal in another preferred embodiment of the invention.

It is well known from the art of digital signal processing that the frequency spectrum bandwidth of each component in the new composite video signal being derived from the combination means 24 in FIG. 2 will increase during picture compression and decrease during picture expansion, as compared to the bandwidths of the individual components in the composite video signal being applied to the separation means 16. Therefore, picture quality may suffer when the image is compressed in the manner described previously relative to FIGS. 1a, 1b, and 1c because aliasing or fold-over results when a signal is sampled at an effective rate less than the Nyquist rate. Embodiments of the processor means 18, 20, and 22 shown in FIG. 2 are possible wherein the aliasing or fold-over problem is avoided. In such embodiments, a filter means 38 is incorporated as shown in FIG. 3 for band limiting the original pixels to establish the effective rate of the interpolated pixels at a level above the Nyquist rate when compressing the image size. As discussed previously, the degree of image compression in the horizontal and/or vertical directions may be adjustable and the desired band limiting by the filter means 38 will vary with the compression factor in each direction. Because such compression factors are determined by the interpolated pixel rates as previously discussed, the rate control means 36 is also connected to set an adjustable horizontal filter 40 and an adjustable vertical filter 42 respectively, within the filter means 38 of FIG. 3.

With the polynomial interpolation means 32 and the filter means 38 incorporated into each of the component processor means 18, 20, and 22 in FIG. 2, the original pixels are directed from the component separation means 16 through the adjustable horizontal and/or vertical filters 40 and 42 to the buffer memory 34. Horizontal filter 40 would be adjustable to pass all frequencies below a predetermined level, while vertical filter 42 would be a comb type that is adjustable to pass information appearing between the harmonics of the horizontal line frequency. Since the polynomial interpolation means 32 and the filter means 38 are both controlled by the rate control means 36, the bandwidth of the interpolated pixels being derived during image compression by each processor means 18, 20, and 22 is limited in accordance with the interpolation rate to avoid the problems of aliasing or fold-over. If the image were to be compressed to one quarter size in both the horizontal and vertical directions as an example, the rate control means 36 would set the interpolation rate at 25% of the original pixels' rate and would set the filter means 38 to limit the frequency spectrum of the original pixels to 25% of their bandwidth.

Figure 4:
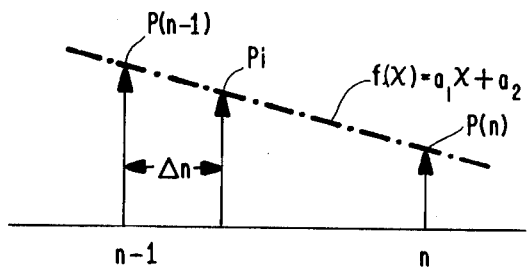
FIG. 4 illustrates a first order polynomial interpolation of a pixel that is located in a single direction.

Solutions to polynomial functions become more complex as their order N increases and therefore, linear interpolation with a first order polynomial function requires the least amount of hardware. Being linear this polynomial function is the equation for a straight line as shown in FIG. 4 and has the form of $f(x) = a_1 x + a_2$ wherein the value of x is determined by the location at which interpolation is desired, while $a_1$ and $a_2$ are determined from the N+1 adjacent original pixel values. Designating the adjacent original pixel values as $P(n)$ and $P(n-1)$, it is noted that the interpolated pixel value $P_i$ lies between $P(n)$ and $P(n-1)$. In accordance with the conventional solution for first order polynomial functions, $a_1 = P(n) - P(n-1)$ and $a_2 = P(n-1)$, while $x = \Delta n$ so that $f(x) = [P(n) - P(n-1)] \cdot \Delta n + P(n-1)$. Assuming that $\Delta n$ is derived from the interpolation rate control means 36, the hardware required within the polynomial interpolation means 32 must provide one subtraction, one addition, and one multiplication for each location at which interpolation between two adjacent original pixel values is required to derive the desired interpolated pixel value.

Figure 5:
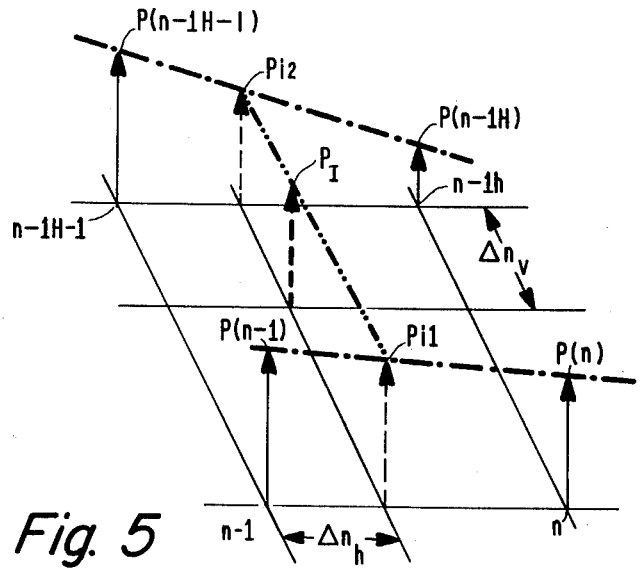
FIG. 5 illustrates a first order polynomial interpolation of a pixel that is located in two directions.

Although such hardware would be sufficient to alter a single dimension of the image such as either the horizontal or vertical, where both horizontal and vertical size altering capability is desired, the hardware must provide for interpolating at three locations. As shown in FIG. 5, interpolations at two locations are first derived between adjacent original pixel values on adjacent horizontal lines and then interpolation at the third location is derived from between the first two interpolated locations along the adjacent horizontal lines. Only four original pixel values are necessary in making the three interpolations; P(n) the current pixel value, P(n−1), P(n−1H), and P(n−1H-1) where 1H represents a pixel distance of one horizontal line. Applying the conventional solution discussed previously to first derive the values of $P_{i1}$ at a location between original pixel values P(n) and P(n−1) on one horizontal line and of $P_{i2}$ at a location between original pixel values P(n−1H) and P(n−1H-1) on the adjacent horizontal line, and then deriving the value of $P_I$ at a location between $P_{i1}$ and $P_{i2}$ the following equations are obtained:

$$P_{i1}=[P(n)-P(n-1)]\cdot\Delta n_h+P(n-1)$$

$$P_{i2}=[P(n-1H)-P(n-1H-1)]\cdot\Delta n_h+P(n-1H-1)$$

$$P_I=[P_{i1}-P_{i2}]\cdot\Delta n_v+P_{i2}$$

Assuming that $\Delta n_h$ and $\Delta n_v$ are derived from the interpolation rate control means 36, the hareware required in the polynomial interpolation means 32 must provide three subtractions, three additions, and three multiplications for interpolating at the three locations to derive the value of $P_I$.

Figure 6:
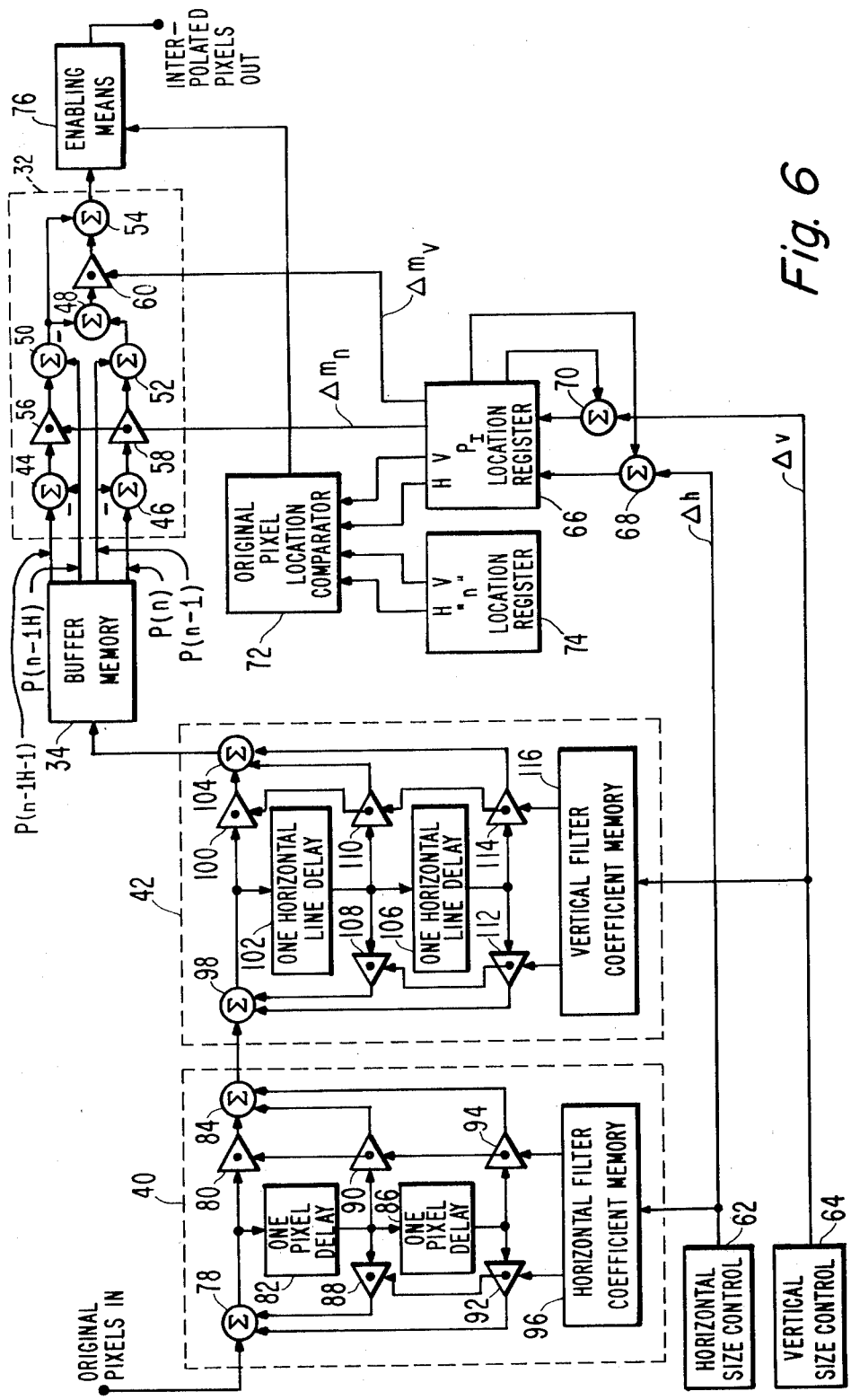
FIG. 6 is a block diagram for another single component pixel processor in a specific embodiment of the invention.

Hardware is shown in FIG. 6 for providing both horizontal and vertical picture size altering capability with an embodiment of the component processor means 18, 20, and 22 of FIG. 2. In accordance with the previous discussion, the capacity of the buffer memory 34 is determined from the number of original pixels in one horizontal line plus one such pixel, which is conventionally designated as a 1H+1 delay. Three subtractors 44, 46, and 48; three adders 50, 52 and 54; and three multipliers 56, 58, and 60 are arranged within the polynomial interpolation means 32 to receive the four original pixel values from the memory 34 and perform the interpolations in the previously discussed manner. Within the interpolation rate control means 36, horizontal and vertical size controls 62 and 64 establish the horizontal and vertical interpolation rates Δh and Δv respectively, by applying digital set levels to a $P_I$ location register 66 through adders 68 and 70 respectively. The horizontal and vertical locations of the current $P_I$ in the register 66 are fed back to the adders 68 and 70 which therefore produce outputs representative of the next $P_I$ to be derived. Register 66 applies outputs to the multipliers 56, 58, and 60 that represent the magnitudes of $\Delta n_h$ and $\Delta n_v$ in the FIG. 5 derivation of the current $P_I$, and also applies outputs to an original pixel location comparator 72 that represent the horizontal and vertical location of P(n) in the derivation. A "n" location register 74 applies outputs to the comparator 72 that represent the horizontal and vertical locations of the current P(n) in the memory 34 and an output from the comparator 72 is applied to control a means 76 for enabling the polynomial interpolation means 32.

Original pixel values are continuously being clocked through the memory 34 which in turn is continuously supplying information regarding P(n), P(n−1), P(n−1H), and P(n−1H-1) to the polynomial interpolation means 32. Furthermore, the multiplication factors of multipliers 56, 58, and 60 are continuously being set by the $\Delta n_h$ and $\Delta n_v$ outputs from the register 66 so that the polynomial interpolation means 32 is continuously outputting some interpolated pixel value $P_I$. However, the enabling means 76 only passes the output from the polynomial interpolation means 32 on command from the comparator 72 when register 74 indicates that the current P(n) is proper for interpolating the value of the current $P_I$ in register 66. During image compression, original pixel information is clocked to the buffer memory 34 at the synchronous rate while the $P_I$ location information is clocked into the register 66 at less than the synchronous rate and therefore, the comparator 72 controls the enabling means 76 to produce the $P_I$ values at less than the synchronous rate. During image expansion, original pixel information is clocked to the buffer memory 34 at a rate less than the synchronous rate while the $P_I$ location information is clocked into the register 66 at the synchronous rate and therefore, the comparator 72 controls the enabling means 76 to produce $P_I$ values at the synchronous rate.

Although many types of digital filters are known that could be utilized within the filter means 38 of FIG. 3, conventional digital recursive filters are utilized as the adjustable horizontal and vertical filters 40 and 42 in FIG. 6. Original pixel information is clocked into the adjustable horizontal filter 40 through the first input of a triple input adder 78 from which the output is applied to the inputs of a multiplier 80 and a one pixel delay 82. Output from multiplier 80 is applied to one input of a triple input adder 84. Output from the delay 82 is applied to the input of a one pixel delay 86 and to the inputs of multipliers 88 and 90 which have their outputs applied separately to the second inputs of the adders 78 and 84 respectively. Output from the delay 86 is applied to the inputs of multipliers 92 and 94 which have their outputs applied separately to the third inputs of the adders 78 and 84 respectively. The multipliers 80, 88, 90, 92, and 94 provide adjustable multiplication factors which are set in accordance with the horizontal interpolation rate Δh of the horizontal size control 62 through a memory 96 for storing horizontal filter coefficients. Information is clocked into the adjustable vertical filter 42 through the first input of a triple input adder 98 from which the output is applied to the inputs of a multiplier 100 and a one horizontal line delay 102. Output from multiplier 100 is applied to one input of a triple input adder 104. Output from the delay 102 is applied to the input of a one horizontal line delay 106 and to the inputs of multipliers 108 and 110 which have their outputs applied separately to the second inputs of the adders 98 and 104 respectively. Output from the delay 106 is applied to the inputs of multipliers 112 and 114 which have their outputs applied separately to the third inputs of the adders 98 and 104 respectively. Multipliers 100, 108, 110, 112, and 114 provide adjustable multiplication factors which are set in accordance with the vertical interpolation rate Δv of the vertical size control 64 through a memory 116 for storing the vertical filter coefficients.

The original pixel information is clocked through the adjustable horizontal and vertical filters 40 and 42 wherein the adders and delays cooperate to limit the frequency spectrum of that information in accordance with the multiplication factors of the multipliers. The operation of these filters 40 and 42 is well known in the art and is explained in many textbooks, such as in chapter 7 of *Digital Signal Processing* by William D. Stanley and published by Reston Publishing Company, Inc. of Reston, Virginia. As explained previously, the band limiting by filters 40 and 42 is only necessary during image compression. Therefore, the multiplication factors of multipliers 80 and 100 are set to unity while the multiplication factors of multipliers 88, 90, 92, 94, 108, 110, 112, and 114 are set to zero during image expansion so that the original pixel information passes through filters 40 and 42 without being band limited. Furthermore, filters 40 and 42 can be arranged in any order relative to the buffer memory 34.

What I claim is:

1. In television image size altering apparatus of the type wherein pixels relating to a composite video signal are sampled at a synchronous real time rate and wherein the flow of pixel information is coordinated through a memory by a write control and a read control, the improvement comprising:
   means for separating the composite signal pixels into original pixels relating to each basic component of the video signal;
   processor means relating to each basic component for deriving interpolated pixels from said original pixels at an effective rate less than the synchronous rate when compressing the picture size and at an effective rate greater than the synchronous rate when expanding the picture size; and
   means for combining said interpolated pixels into new pixels relating to a new composite video signal, said new pixels being presented for display at the synchronous rate to alter the size of the television image.

2. The television image size altering apparatus of claim 1 wherein said processor means includes digital filter means for band limiting said original pixels of each video signal component to establish the effective rate of said interpolated pixels at a level above the Nyquist rate when compressing the image size.

3. The television image size altering apparatus of claim 2 wherein said digital filter means includes an adjustable low pass filter relative to horizontal pixel locations and an adjustable comb filter relative to vertical pixel locations.

4. The television image size altering apparatus of claim 3 wherein said adjustable horizontal and vertical filters each include:
   a first triple input adder to which said original pixel information is applied at the first input thereof;
   a first multiplier disposed to receive the output from said first adder for establishing a first multiplication factor;
   a second triple input adder having the output from said first multiplier applied at the first input thereof;
   a first one pixel location delay disposed to receive the output from said first adder;
   second and third multipliers for establishing second and third multiplication factors respectively, and having the output from said first delay applied commonly thereto while having the outputs therefrom separately applied to the second inputs of the first and second adders respectively;
   a second one pixel location delay disposed to receive the output from said first delay;
   fourth and fifth multipliers for establishing fourth and fifth multiplication factors respectively and having the output from said second delay applied commonly thereto while having the outputs therefrom separately applied to the third inputs of said first and second adders respectively; and
   a memory for separately adjusting the multiplication factors of said first, second, third, fourth, and fifth multipliers in accordance with the filter coefficients required to avoid aliasing at the effective rate of deriving said interpolated pixels by said processor means.

5. The television image size altering apparatus of claim 1 wherein said processor means includes:
   means for applying polynomial functions to derive said interpolated pixels from said original pixels;
   a buffer memory for applying said original pixels to said polynomial interpolation means; and
   means for controlling the rate at which said interpolated pixels are derived by said polynomial interpolation means.

6. The television image size altering apparatus of claim 5 wherein said polynomial interpolation means is linear and includes:
   a first subtractor having an output equal to the signal at its first input minus the signal at its second input, said first subtractor having original pixel information from a first location applied at the first input thereof;
   a first adder having an output equal to the signal at its first input plus the signal at its second input, said first adder having original pixel information from a second location immediately subsequent to said first location applied at the first input thereof;
   a second adder having an output equal to the signal at its first input plus the signal at its second input, said second adder having original pixel information from a third location subsequent to said first location by one horizontal line applied at the first input thereof;
   a second subtractor having an output equal to the signal at its first input minus the signal at its second input, said second subtractor having original pixel information from a fourth location immediately subsequent to said third location applied at the first input thereof;
   a first multiplier for establishing a multiplication factor between the output from said first subtractor and the second input of said first adder;
   a second multiplier for establishing a multiplication factor between the output from said second subtractor and the second input to said second adder;
   a third subtractor having an output equal to the signal at its first input minus the signal at its second input, said third subtractor having the output from said first adder applied to the first input thereof and the output from said second adder applied to the second input thereof;
   a third adder having an output equal to the signal at its first input plus the signal at its second input, said third adder having the output from said second adder applied to the first input thereof and producing the current interpolated pixel value at its output;
   a third multiplier for establishing a multiplication factor between the output from said third subtractor and the second input to said third adder; and
   said first, second, and third multipliers having their multiplication factors separately adjusted by said interpolation rate control means in accordance with the location at which the interpolated pixel value is to be derived.

* * * * *